No. 859,309. PATENTED JULY 9, 1907.
W. S. MacHARG.
DEVICE FOR EXTRACTING FLUID FROM SATURATED MATERIAL.
APPLICATION FILED SEPT. 18, 1905.
3 SHEETS—SHEET 1.
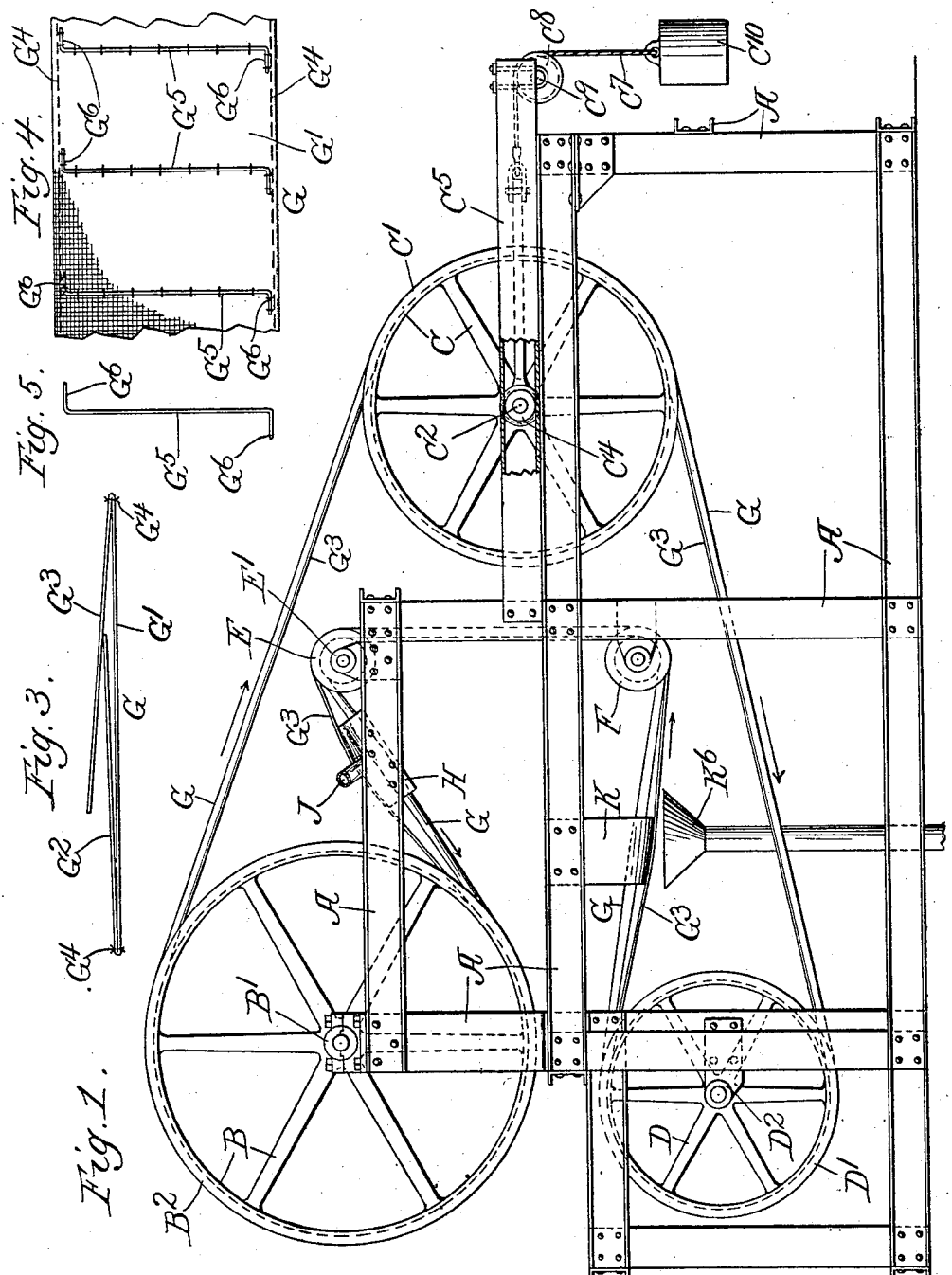

No. 859,309. PATENTED JULY 9, 1907.
W. S. MacHARG.
DEVICE FOR EXTRACTING FLUID FROM SATURATED MATERIAL.
APPLICATION FILED SEPT. 18, 1905.
3 SHEETS—SHEET 2.
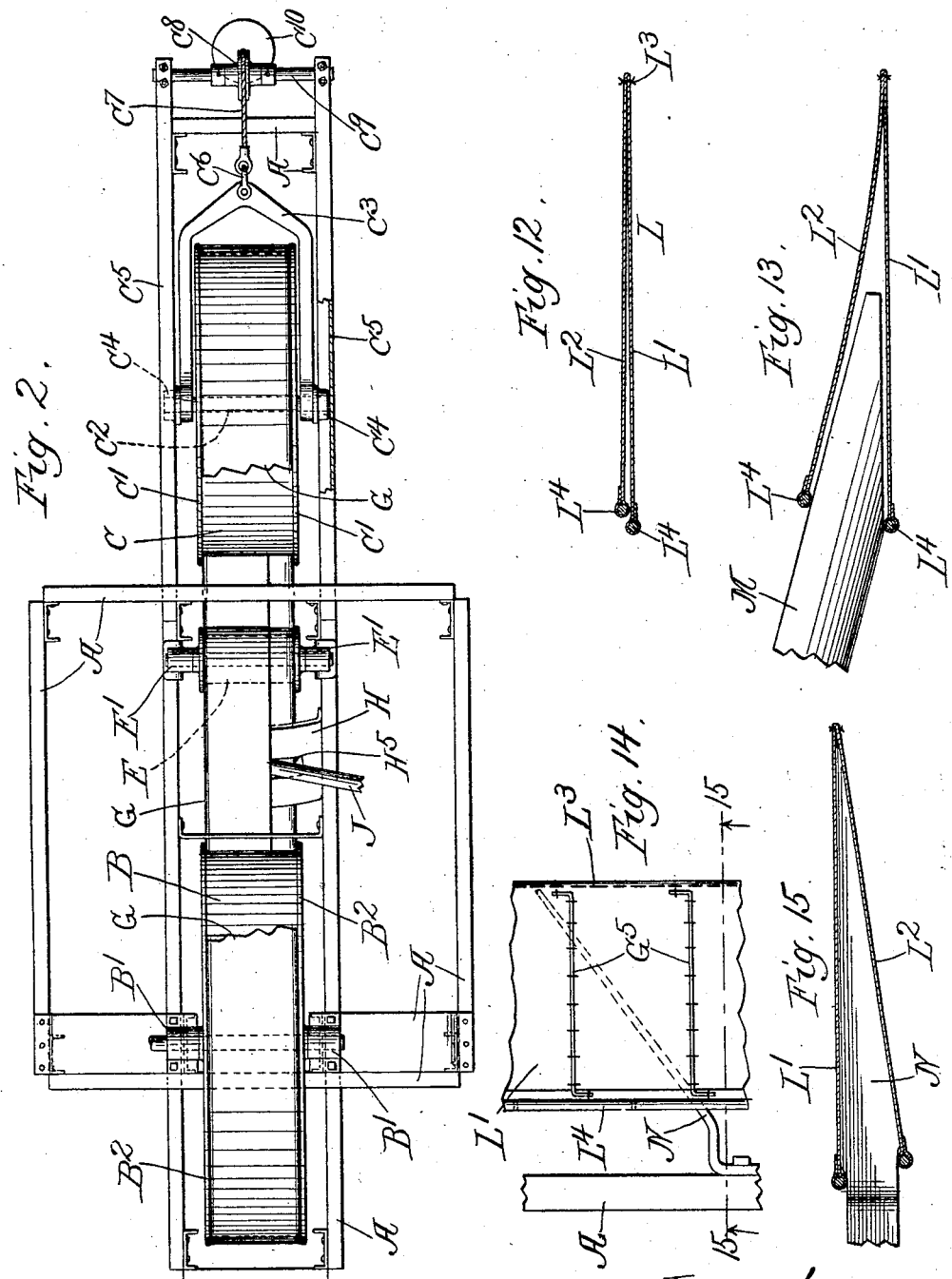
Witnesses.
Edward T. Wray
Howard L. Kraft
Inventor,
William S. MacHarg
by Parker Carter
Attorneys.

No. 859,309. PATENTED JULY 9, 1907.
W. S. MacHARG.
DEVICE FOR EXTRACTING FLUID FROM SATURATED MATERIAL.
APPLICATION FILED SEPT. 18, 1905.
3 SHEETS—SHEET 3.
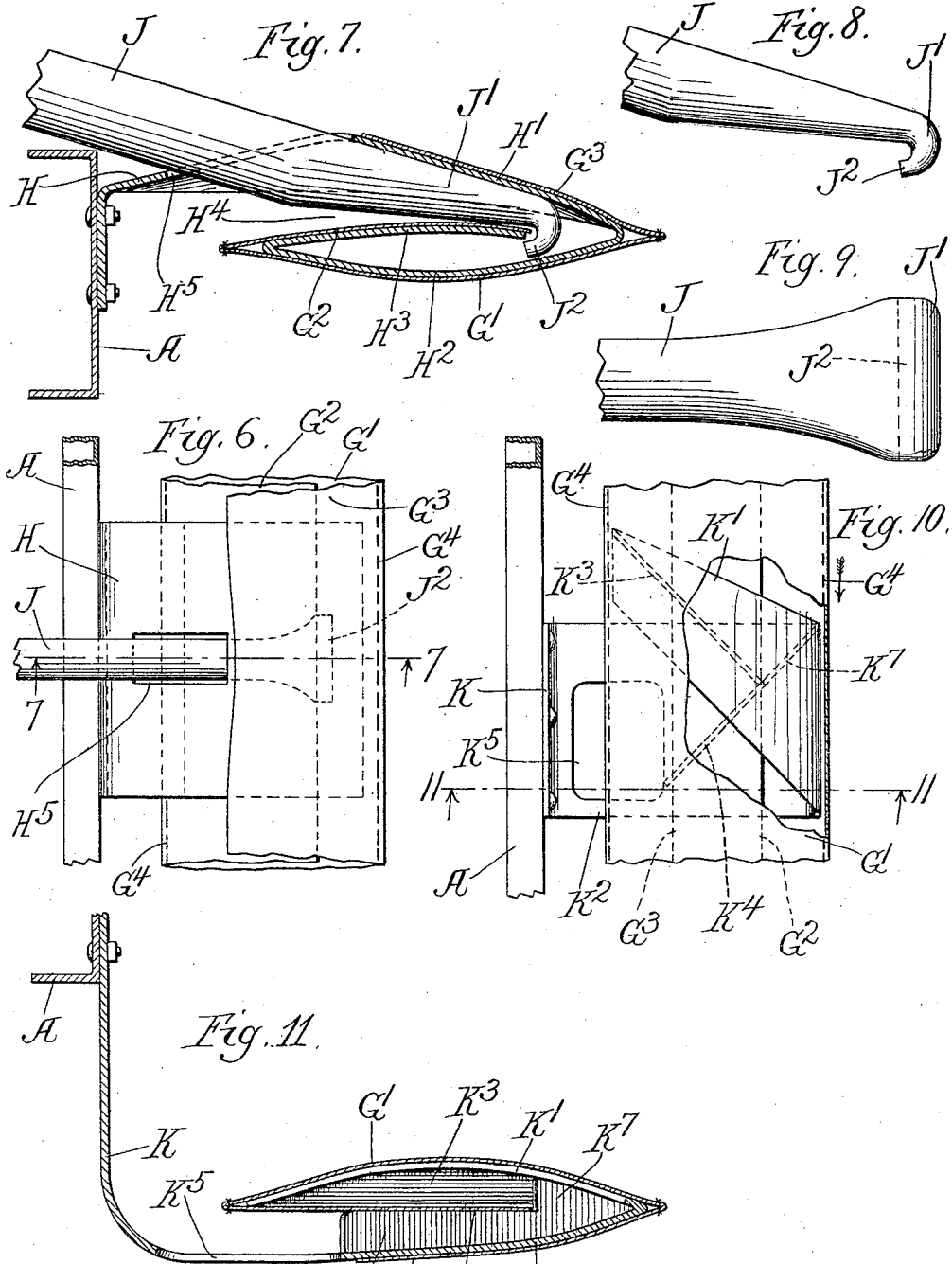

UNITED STATES PATENT OFFICE.

WILLIAM S. MACHARG, OF CHICAGO, ILLINOIS.

DEVICE FOR EXTRACTING FLUID FROM SATURATED MATERIAL.

No. 859,309.   Specification of Letters Patent.   Patented July 9, 1907.

Application filed September 18, 1905. Serial No. 278,911.

*To all whom it may concern:*

Be it known that I, WILLIAM S. MACHARG, a citizen of the United States, residing at Chicago, in the county of Cook and State of Illinois, have invented a certain new and useful Improvement in Devices for Extracting Fluid from Saturated Material, of which the following is a specification.

My invention relates to devices for extracting fluids from saturated material and has for its object, among other things to provide new and improved constructions in the belts for such devices and the means for feeding and discharging the material therefrom.

I have illustrated one form of my device with certain modifications in the accompanying drawings, wherein Figure 1 is a side elevation of the machine; Fig. 2, a plan view; Fig. 3, a cross section through one form of belt; Fig. 4, an inverted plan view of the same; Fig. 5, a detail of one of the reinforcing strips; Fig. 6, a detail plan view of the spreading and filling device; Fig. 7, a section on line 7—7 of Fig. 6; Figs. 8 and 9 are details of the feeding tube; Fig. 10, a plan view of the discharging device; Fig. 11, a sectional view on line 11—11 of Fig. 10; Fig. 12, a cross section through a modified form of belt; Fig. 13, a similar sectional view showing the belt spread by the filling tube; Fig. 14, a plan of the inverted belt and discharging scraper, and Fig. 15, a detail sectional view of the same on line 15—15 of Fig. 14.

Like letters of reference indicate like parts in all the drawings.

The purpose of the machine is to extract liquid from saturated material by confining such material between the folds or sections of an endless porous belt or the like, such belt being run over a series of pulleys and kept tense by appropriate mechanism.

In the particular machine here shown, A A represents the frame work supporting a driving wheel B which may be driven from any preferred source of power and which is journaled in bearings $B^1$ on the frame work and is preferably provided with the flanges $B^2 B^2$.

Forward of the wheel B is the wheel C having flanges $C^1 C^1$ and rigid on the shaft $C^2$ which turns in a yoke $C^3$ and has at its extremities rollers $C^4 C^4$ which form movable bearings for such shaft in channel irons $C^5 C^5$ forming a forward extension of the frame work A. On the yoke $C^3$ is the ring $C^6$ to which is attached a wire rope or the like $C^7$, extending over a pulley $C^8$ turning on an axle $C^9$ at the outer extremities of the channel irons. The end of the rope $C^7$ carries the counter-weight $C^{10}$.

Beneath the wheel B is a wheel D also having flanges as shown at $D^1$, and journaled in bearings $D^2$ on the frame work. Between wheels B and C is preferably placed the flanged roller E turning in bearings $E^1 E^1$, and between the wheels C and D, another similar roller F mounted in like manner. The belt, whatever form may be desirable to use, extends around the wheel B, then over C, around D, over F and then E to B. The counterweight will keep the belt taut. It will, of course, be obvious that the number of wheels, rollers, and the like might be multiplied indefinitely, or that some of those shown might be dispensed with according to the varying conditions met with in the material for which the particular machine is constructed.

The belt used may differ considerably in construction. In Figs. 3 and 4 I have shown one construction where a strip of webbing, indicated generally by the letter G, is folded so as to have a bottom section $G^1$ and two upper sections $G^2$, $G^3$ preferably of equal width and the one overlapping the other as shown. Of course the belt might be made of three separate pieces and stitched together at these places. In order to keep the belt in shape, I preferably make the same with the seams $G^4 G^4$ which stitch down the sections $G^2$, $G^3$ onto the bottom section $G^1$. In order to counteract the tendency of the belt to string, I prefer to construct it with metal strips $G^5 G^5$ placed at intervals along the bottom part $G^1$. These re-inforcing pieces are preferably made of hard brass wire with the ends turned over, as shown at $G^6 G^6$ in Fig. 4, and run into the fabric and sewed thereto at each end. This method of re-inforcement is not, however, essential to my invention and might in some instances be dispensed with.

The belt is preferably put on the wheels so that the part between the wheel B and the roller E will have the folds $G^2$, $G^3$ on top and at this point I prefer to feed the material into the belt. With this end in view, the machine is provided with a stretching and feeding mechanism which may be located on the beam of the frame work A which supports the wheel B and the roller E. These devices are shown in detail in Figs. 6 to 9 inclusive.

H represents a strip of metal forming what I will term a spreader, extending transversely of the belt, bowed up at $H^1$ so as to engage and lift the fold $G^3$ then turned at a sharp angle backward upon itself and bowed downward at $H^2$ so as to distend the section $G^1$ of the belt, then turned upon itself again and bent inward at $H^3$ so as to hold the section $G^2$ of the belt somewhat above the middle section so as to leave a space $H^4$ between it and the part $H^1$ of the spreader. The spreader has the aperture $H^5$ in the top part thereof through which extends the feeding tube or spout J which is curved at $J^1$ so as to extend around the edge of the belt section $G^2$ and the part $H^3$ of the spreader, and thus deliver the material approximately on the center of the middle section $G^1$ of the belt at the place where it is depressed by the spreader. Preferably I make the discharge end of the spout flattened and extended, as shown at J² in Figs. 8 and 9, in order to facilitate the feeding process.

It will be obvious that the section of the belt between the wheel D and the roller F will be inverted, that is to say, with the folds downward. At this or any other convenient place, the material may be discharged from the belt. To accomplish this, the belt may be again spread, and I prefer to use a device similar to the spreader just above described, which, however, will of course, have to be inverted. It may consist of a strip of metal K having the bowed sections K¹ and K² from the former of which depends the oblique partition or scraper K³ whence the deflector K⁴, placed at a different angle on the part K², deflects the material through an aperture K⁵ into a chute K⁶ leading away from the apparatus. The deflector K⁴ has preferably the enlargement K⁷ to fill the corner of the spacer beyond the section G² of the belt, thus preventing any of the material from being crowded back between the folds of the belt.

In Figs. 12 to 15 inclusive, I have shown another form of belt and different feeding and discharging devices to be used in connection therewith. This belt, indicated generally by the letter L, consists of a lower section L¹ and an upper section L², the two sections being made separately and secured together, or by folding a single piece of webbing. In order to keep the belt in shape, I run the seam L³ along the common edges of the two sections and provide the outer edges of one or both of these sections with cords L⁴, which may be continuous or in sections. The purpose of these cords is to make the edges of the belt more tense than its center portion, and, therefore, to keep the edge of one fold pressed upon the other. The thickening the belt by cords or in any other suitable way brings this about although it is obvious that the result could be accomplished otherwise than as described; but this I consider an efficient means to that end. Preferably the upper section L² is a trifle narrower than the lower section so that it is drawn up against the edge of the upper section, confining the material between the sections in a sort of pocket. I have shown the belt reinforced by metal strips G⁵ similar to the strips G⁵ in the other belt, but these reinforcements may, of course, be dispensed with.

The spreading and scraping devices may be considerably simplified when the belt last described is used. It is only necessary to prop up the section L² and this may be done by extending a suitably formed filling tube M in between the two sections of the belt. In order to discharge the material, the inner surfaces of the belt are scraped by the obliquely placed spreader and scraper N.

I have thus described one form of my apparatus together with certain modifications, but it will be obvious that there might be considerable change made in form and construction without departing from the broad spirit of my invention. Therefore, I do not wish to limit myself to the particular devices and arrangements here shown, but desire that the drawings should be taken as in a sense diagrammatic, although illustrating one of the practical and workable forms of apparatus in which my invention may be embodied. I have described the means for conveying the material and extracting its liquids as a belt, but this term I have intended to be understood broadly to include any flexible means for holding and compressing material where the compression is accomplished chiefly through the agency of the tension of the containing means rather than, for example, by the positive forcing together of the material between relatively rigid bodies.

The use and operation of my machine will perhaps have been made sufficiently obvious by the foregoing. The saturated material is fed in between the folds or sections of the belt, preferably while these are right side up, the belt then being run over a plurality of wheels at a tension maintained by the counterweight C¹⁰. The belt is preferably of porous material such as canvas webbing. As a result, the moisture from the material is squeezed out through the fabric or between its folds so that when it has been carried around to the discharge chute, it is delivered in a substantially dry condition. It will be observed that the sections or folds of the belt are always maintained in the same relation to each other, being merely lifted in order to admit and discharge the material. They do not have to be folded or unfolded. If the belt designated by the letter L is used, this manner of feeding and discharging the material is particularly simple. Except when spread open, however, the belt will firmly hold the material between its folds or sections so that escape is impossible.

I claim:

1. In a machine for extracting fluid from material, the combination of a wheel like structure with a belt to travel over the same, said belt formed of a plurality of longitudinal sections connected together and normally lying one upon another so as to constitute an inclosed pocket, means for maintaining the tension of the belt, means for spreading the sections apart so as to make a passage-way into the inclosed portion and a feeding device associated with the spreader.

2. In a machine for extracting fluid from material, the combination of a wheel like structure with a belt to travel over the same said belt formed of a plurality of longitudinal sections connected together and normally lying one upon another so as to constitute an inclosed pocket, means for maintaining the tension of the belt, and a spreading and feeding device for inserting the material to be treated between such superimposed sections.

3. In a machine for extracting fluid from material, the combination of a wheel like structure with a belt to travel over the same said belt formed of a plurality of longitudinal sections connected together and normally lying one upon another so as to constitute an inclosed pocket, means for maintaining the tension of the belt, and a spreading and feeding device comprising a filling tube for inserting the material to be treated between such superimposed sections.

4. In a machine for extracting fluid from material, the combination of a wheel like structure with a belt to travel over the same said belt formed of a plurality of longitudinal sections connected together and normally lying one upon another so as to constitute an inclosed pocket, means for maintaining the tension of the belt, and a spreading and feeding device comprising a filling tube adapted to extend between such sections.

5. In a machine for extracting fluid from material, the combination of a wheel like structure with a belt to travel over the same said belt formed of a plurality of longitudinal sections connected together and normally lying one upon another so as to constitute an inclosed pocket, means interposed between such sections for maintaining the tension of the belt, and means for discharging the material treated from between such sections.

6. In a machine for extracting fluid from material, the combination of a wheel like structure with a belt to travel over the same said belt formed of a plurality of longitudinal sections connected together and normally lying one upon another so as to constitute an inclosed pocket, means for maintaining the tension of the belt, and means interposed between said sections for discharging the material treated from between such sections comprising a scraping device.

7. In a machine for extracting fluid from material, the combination of a wheel like structure with a belt to travel over the same comprising a plurality of sections lying one upon another so as to inclose the material treated, means for maintaining the tension of the belt, and means for discharging the material from such belt, such means comprising a scraping device adapted to extend between the sections of such belt and into such inclosed portion.

8. In a machine for extracting fluid from material, the combination of a plurality of wheel like structures, a belt to travel over the same said belt formed of a plurality of longitudinal sections connected together and normally lying one upon another so as to constitute an inclosed pocket, and means interposed between said sections intermediate such wheel like structures for inserting the material between the sections of the belt.

9. In a machine for extracting fluid from material, the combination of a plurality of wheel like structures with a belt to travel over the same said belt formed of a plurality of longitudinal sections connected together and normally lying one upon another so as to constitute an inclosed pocket, and means intermediate such wheel like structures for discharging the material from between the sections of the belt without unfolding the belt.

10. In a machine for extracting fluid from material, the combination of a plurality of wheel like structures with an endless belt comprising a lower section upon which the material is received, and at least one superimposed upper section connected with the lower section so as to form a normally closed pocket adapted to hold the material, and means interposed between said sections for delivering the material into the pocket between such superimposed sections.

11. In a machine for extracting fluid from material, the combination of a plurality of wheel like structures with an endless belt comprising a lower section upon which the material is received, and at least one superimposed upper section connected with the lower section so as to form a normally closed pocket adapted to hold the material in place, means interposed between said sections for delivering the material into the pocket between such superimposed sections, and means for discharging the material from such belt when the parts are in their inverted position without unfolding the belt.

12. In a machine for extracting fluid from material, the combination of a plurality of wheel like structures revoluble in the same planes, with a belt to travel over the same said belt formed of a plurality of longitudinal sections connected together and normally lying one upon another so as to constitute an inclosed pocket, means interposed between said sections for feeding the material so as to be carried between such sections lying one upon another, and means for discharging it therefrom.

13. In a machine for extracting fluid from material, the combination of a plurality of wheel like structures, with a belt formed of a plurality of longitudinal sections connected together and normally lying one upon another to constitute an inclosed pocket, means interposed between said sections for feeding the material onto such belts so as to be held between such sections, one of such wheel like devices being movably mounted, and a tension device associated therewith to maintain the tension of such belt.

14. In a machine for extracting fluid from material, the combination of a plurality of wheel like structures, with a belt comprising a plurality of sections lying one upon another, a tension device, and means associated with such belt for preventing the same from stringing.

15. In a machine for extracting fluids from material, a belt comprising a plurality of longitudinal sections connected together and normally lying one upon another to constitute an inclosed pocket to contain the materials treated, said belt having seams along its outer edges binding the upper folds to the lower fold.

16. In a machine for extracting fluid from material, a belt comprising a plurality of sections lying normally one upon another so as to form a single folded structure to inclose the material treated, and transverse re-inforcing devices to prevent the belt from stringing.

17. In a machine for extracting fluid from material, a belt comprising a plurality of sections lying normally one upon another so as to form a single folded structure to inclose the material treated, and transverse reinforcing devices comprising metallic strips secured in the fabric of such belt.

18. In a machine for extracting fluid from material, a belt comprising a bottom section and at least one upper section, and reinforcing means comprising metallic strips run through the fabric of such lower section, and having off sets near the edges of such section.

19. In a machine for extracting fluid from material, a belt comprising a bottom section with an upper section folded over the bottom section, and means for making at least one of the edges of such belt more tense than the rest of the belt.

20. In a machine for extracting fluid from material, a belt comprising a bottom section, with an upper section folded over the bottom section, the free edge of the upper section being substantially thickened relative to the body of such belt.

21. In a machine for extracting fluid from material, a belt comprising a bottom section with an upper section folded over the bottom section, such upper section of less width and having its free edge substantially thickened relative to the main body of the belt.

WILLIAM S. MacHARG.

Witnesses:
PERCIVAL W. TRUMAN,
HOMER L. KRAFT.